United States Patent [19]
Benskin et al.

[11] Patent Number: 6,083,385
[45] Date of Patent: Jul. 4, 2000

[54] CLEANSING SYSTEM

[76] Inventors: Charles O. Benskin, 14528 Pleasant Valley Rd., South Beloit, Ill. 61080; Harley A. Weisse, S23 W23 181 Broadway, Waukesha, Wis. 53186

[21] Appl. No.: 09/038,074

[22] Filed: Mar. 11, 1998

[51] Int. Cl.[7] .................................................. C02F 1/78
[52] U.S. Cl. ..................... 210/192; 210/195.1; 210/205; 210/218
[58] Field of Search .................................. 200/760, 765, 200/192, 195.1, 203–205, 218

[56] References Cited

U.S. PATENT DOCUMENTS

| | | | |
|---|---|---|---|
| 4,250,040 | 2/1981 | LaRaus | 210/760 |
| 4,798,669 | 1/1989 | Bachhofer et al. | 210/192 |
| 4,906,358 | 3/1990 | Sasaki et al. | 210/192 |
| 5,075,016 | 12/1991 | Barnes | 210/760 |
| 5,498,347 | 3/1996 | Richard | 210/192 |

*Primary Examiner*—Thomas G. Wyse

[57] ABSTRACT

A cleansing system for removing pollutants from a liquid waste by being pumped from a source to a blend recycle tank. The blend recycle tank supplies liquid waste to a first receiving reactor tank through an overflow pipe. A circulating flow is established between the first receiving reactor tank and a primary reactor tank through a lower conduit and an upper overflow conduit. An ozone generator supplies ozone to the lower conduit. An upper gas fume conduit returns excess ozone from the primary reactor tank to said receiving reactor tank and to the supply of liquid being pumped from a source for further mixing of ozone and liquid waste.

10 Claims, 1 Drawing Sheet

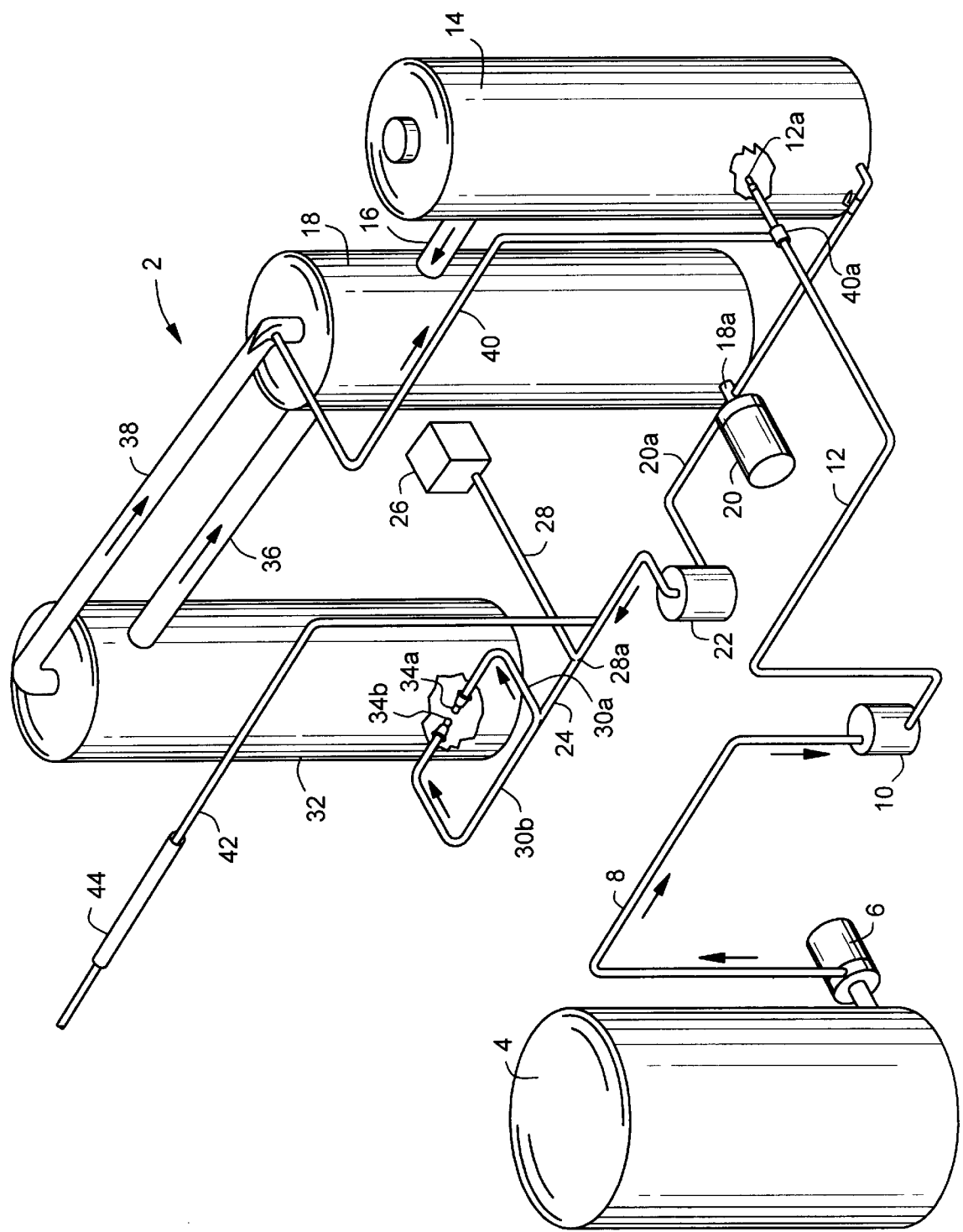

CLEANSING SYSTEM

BACKGROUND OF THE INVENTION

1. Field of the Invention

This invention relates in general to sanitation equipment and, more particularly, a cleansing system employing ozone for numerous applications.

2. Description of the Prior Art

In the cleansing of liquids and suspensions of many types, numerous techniques have been developed for removing pollutants. Waste liquids may be produced from a large range of sources, including, but not limited, to those generally produced in food processing of many kinds, waste water used for cleansing chickens and the like, cheese brine, petroleum wastes, fats, oils and greases, soil and other pollutants. Ozone used under proper conditions is known to a highly effective in purifying a liquid in a manner that the cleansed liquid may be reused. Ozone can be effective in sanitizing and oxidizing the pollutant liquid or can be added to clean water to be applied as a sanitizing agent for many applications. Prior art techniques using ozone as a cleansing agent are relatively complex, often limited in effectiveness, and expensive to manufacture and to use. Accordingly, there is a need in the prior art to provide an improved cleansing system utilizing ozone in an economical and effective manner for cleansing.

SUMMARY OF THE INVENTION

It is, therefore, an objective of the present invention to provide an improved cleansing system in which ozone is effectively utilized to cleanse liquids of many types or is added to clean water or cleansed liquid to be applied as a spray in numerous applications. The system of the invention not only sanitizes the liquids in connection with the use of ozone, but further oxidizes, filters and bleaches the liquid in such a manner that the cleansed product can be safely reused. The system of the invention is efficient, economical to manufacture and use, and employs a closed loop for effective results. The invention herein disclosed utilizes a pressurized system and a high concentration of micro-bubbles of ozone in a manner that a quicker and more complete reaction results. The invention can be utilized in connection with the food and drink industry, such as, for example, contaminated water from poultry or other meat being processed in a conventional manner. The invention of the application can effectively also cleanse waste sewer water, cheese brine, petroleum, fats, oils, greases, soil and other polluted liquids as needed.

BRIEF DESCRIPTION OF THE DRAWING

FIG. 1 is a schematic view of the cleansing system of the invention.

DESCRIPTION OF THE PREFERRED EMBODIMENT

Referring now to the figure, the cleansing system of the invention is illustrated and generally designated by reference numeral 2. The polluted liquid to be cleansed by the invention is fed to cleansing system 2 from a suitable source, such as, waste liquid storage container 4 containing, for example, waste water. Alternatively, the water supplied from a source 4 can be clean water or other liquid in cleansed form which is directed to cleansing system 2 for addition of micro-bubbles of ozone as will be explained. The liquid waste being directed to cleansing system 2 can be derived from any source of contaminated liquid, such as produced in food and drink processing, from the treatment of poultry and other animals with water, cheese brine, petroleum, sewer water, fats, grease, oils, soil and other pollutants. A suitable centrifugal pump 6 directs a flow of liquid waste through conduit 8 having a micro filter 10 for an initial removal of some solids which may be in the contaminated liquid. The initially filtered waste liquid is introduced through conduit 12 into a blend recycle tank 14. To increase mixing in the blend recycle tank 14, an internal mix eductor 12a, such as a nozzle, forces the infeed from pipe 12 to be injected into the tank under pressure for improved mixing.

An upper overflow conduit 16 is connected between blend recycle tank 14 and an adjacent secondary reactor tank 18, such that the overflow of contents in blend recycle tank 14 is delivered to the secondary reactor tank 18. An outlet pipe 18a is attached to the bottom of secondary reactor tank 18 and to a pump 20, such as a centrifugal pump. The pump 20 delivers a circulating flow of liquid from secondary reactor 18 through conduit 20a to fine filter 22 of known design to remove additional solids. After passing through the filter 22, the circulating flow is directed through conduit 24 to which an ozone generator 26, such as manufactured by Ozone Technology of Tyler, Tex., is in fluid communication. Alternatively, the ozone can be applied to the circulating flow in a vacuum chamber (not shown) in a known manner. The ozone generator 26 produces a high output of ozone gas which is directed through pipe 28 to conduit 24 at point 28a. An ozone eductor (not shown) is mounted internally within conduit 26 to insure high levels of ozone being injected in the circulating flow under shear with the formation of small bubbles of ozone. As is well known, the ozone eductor may include a venturi within conduit 26.

The circulating flow is then divided into two conduit branches 30a and 30b which extend into a primary reactor tank 32. Opposed nozzles 34a and 34b are mounted internally within the primary reactor tank 32 in opposed relationship to mix the circulating flow under pressure with the contents of the primary reactor tank 32 to create better mixing with small bubbles of ozone. An overflow tube 36 is connected between the primary reactor tank 32 and the secondary reactor tank 18 so that the overflow in the primary reactor tank 32 is returned to the secondary reactor tank 18 to maintain a return flow of liquid circulation between primary reactor tank 32 and secondary reactor tank 18. An upper vapor vent tube 38 connects the interior of primary reactor tank 32 with the interior of the secondary reactor tank 18 so that gas fumes, primarily ozone, are returned to the secondary reactor tank 18 to mix with the contents of the secondary reactor tank 18 for further treatment. As seen in the drawing, a secondary vapor vent tube 40 is connected to vapor vent 38 to direct a portion of the ozone fumes to conduit 12 at point 38a upstream of the injection of liquid waste from waste storage 4 into blend recycle tank 14 so as to inject ozone into the liquid waste in conduit 12 prior to entry into blend recycle tank 14.

As should be apparent, the secondary reactor tank 12 and the primary reactor tank 32 create a circulating flow between each other of a relatively large flow rate subjected to the cleansing action of ozone. A small portion of the circulating flow with micro-bubbles of ozone is removed through removal tube 42 attached to conduit 20 by action of removal pump (not shown) to return to storage or reuse. An ultra-violet system 44 or filter (not shown) may be mounted in tube 42 to provide a final cleaning of the removed liquid. For purposes of example only and not intended to be so limited, the cross circulating flow between secondary reactor tank 18 and primary reactor tank 32 may be approximately 300 gpm dependent on pipe size, tank capacity, the properties of the liquid waste and pump capacity. While a foregoing example of flow of 300 gpm is circulating in system 2, a flow rate of approximately 20 gpm of liquid waste may be, for example, introduced into blend recycle tank 14 through conduit 12 from the source 4, while a flow of approximately 20 gpm of cleansed liquid is removed through removal pipe 42. Other larger and smaller volumes in a suitable ratio may be introduced, circulated and removed from system 2.

In the foregoing description, the cleansing system 2 was described in connection with the cleansing of waste liquids and the like. The cleansing system 2 can further be used to ozonize clean water or other liquid free of pollutants. The clean water is injected into the cleansing system 2 from source 4 in the same manner as previously described and undergoes generally the same process as waste liquids while being impregnated with ozone. A portion of clean liquid having micro-bubbles of ozone being circulated in system 2 is removed through removal tube 42. The removed liquid having micro-bubbles of ozone in accordance with the invention is highly effective in cleaning and sanitizing numerous products and equipment by being sprayed or otherwise applied thereto. Such a cleansing and sanitizing liquid as produced by the invention can be used to clean food products, such as poultry, meats, vegetables and fruits, pharmaceuticals, and the surfaces of machinery and equipment on which cleaning is desired.

What is claimed is:

1. A cleansing system for treating liquids with ozone comprising tank means for receiving a flow of liquid through an inlet means, primary reactor tank means being in fluid communication with said tank means for receiving a flow of ozonated liquid from said tank means, secondary reactor tank means being in fluid communication with said primary reactor tank means for receiving at least a portion of the flow of ozonated liquid from said primary reactor tank means, said secondary reactor tank means further introducing an additional amount of ozonated liquid to the flow of ozonated liquid to said primary reactor tank means, circulating means for creating the flow of the ozonated liquid from said tank means and secondary reactor tank means to said primary reactor tank means ozone generator means being in fluid communication with said circulating means for supplying ozone under pressure into the circulating flow of liquid for creating the ozonated liquid return means for returning the at least a portion of the circulating ozonated liquid to said secondary reactor tank means, and removal means for removing another portion of the flow of ozonated liquid for use of the another portion.

2. The cleansing system according to claim 1 further including conduit means having an upper vapor vent conduit in fluid communication between upper portions of said primary reactor means and said secondary reactor means, said vapor vent conduit receiving excess ozone from said primary reactor tank means and returning said excess ozone to said secondary reactor tank means.

3. The cleansing system according to claim 2 wherein said return means further includes an overflow conduit in fluid communication between said primary reactor tank means and said secondary reactor tank means at positions below said vapor vent conduit, said overflow conduit returning the at least a portion of the flow of ozonated liquid from said primary reactor tank means to said secondary reactor tank means.

4. The cleansing system according to claim 2 further comprising inlet conduit means for supplying the liquid to said tank means, ozone conduit means being in fluid communication between said vapor vent conduit and said inlet conduit means for supplying a portion of the excess ozone in said vapor vent conduit to the liquid prior to being received by said tank means.

5. The cleansing system according to claim 4 wherein said means supply conduit means having pump means for delivering the flow of ozonated liquid from said primary reactor tank means and secondary reactor tanks means.

6. The cleansing system according to claim 2 wherein said primary reactor tank means includes a reactor tank and said secondary reactor tank includes a secondary receiving tank.

7. The cleansing system according to claim 5 wherein said o zone generator means is fluid communication with said supply conduit means for supplying ozone to the circulating flow.

8. The cleansing system according to claim 5 wherein said supply conduit means includes a pair of opposed nozzles mounted within said primary reactor tank means, said nozzles causing ozone to be mixed in the primary reactor tank means under pressure.

9. The cleansing system according to claim 5 further including a primary overflow conduit between said tank means and said secondary reactor tank means for supplying ozonated liquid to said secondary reactor tank means.

10. The cleansing system according to claim 1 further including supply means for creating a input flow in said inlet conduit means into said tank means at a first flow rate, said pump means coupled to said supply conduit means for creating the circulating flow of ozonated liquid at a second flow rate, said second flow rate being at least ten times greater than said first flow rate.

* * * * *